United States Patent
Alruwaili et al.

(10) Patent No.: US 11,143,578 B2
(45) Date of Patent: Oct. 12, 2021

(54) DETERMINING IN-SITU ROCK STRESS

(71) Applicant: Saudi Arabian Oil Company, Dhahran (SA)

(72) Inventors: Khalid Mohammed M. Alruwaili, Dhahran (SA); Mirajuddin Riazuddin Khan, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 627 days.

(21) Appl. No.: 15/876,992

(22) Filed: Jan. 22, 2018

(65) Prior Publication Data
US 2019/0226956 A1 Jul. 25, 2019

(51) Int. Cl.
*G01N 3/12* (2006.01)
*G01V 1/46* (2006.01)
(Continued)

(52) U.S. Cl.
CPC .............. *G01N 3/12* (2013.01); *E21B 33/12* (2013.01); *E21B 47/06* (2013.01); *E21B 47/14* (2013.01);
(Continued)

(58) Field of Classification Search
CPC ... G01N 3/12; G01V 1/46; G01V 1/50; E21B 47/06; E21B 47/14; E21B 33/12; E21B 49/00; E21B 49/006
See application file for complete search history.

(56) References Cited

U.S. PATENT DOCUMENTS

| 2,688,369 | A | 9/1954 | Broyles |
| 7,828,063 | B2 | 11/2010 | Olsen et al. |

(Continued)

FOREIGN PATENT DOCUMENTS

| CN | 101726223 | 6/2010 |
| WO | WO2010074581 | 7/2010 |
| WO | WO2010083166 | 7/2010 |

OTHER PUBLICATIONS

Serdyukov et al, "Hydraulic Fracturing for In Situ Stress Measurement", 2016. (Year: 2016).*

(Continued)

*Primary Examiner* — Regis J Betsch
*Assistant Examiner* — Jeremy A Delozier
(74) *Attorney, Agent, or Firm* — Fish & Richardson P.C.

(57) ABSTRACT

A method for determining rock properties includes running a downhole tool into a wellbore formed from a terranean surface to a subterranean zone that includes an underground rock formation, the downhole tool including one or more protrusions coupled with at least one expandable member of the downhole tool, the one or more protrusions including memory metal; actuating the downhole tool, at a location in the wellbore adjacent the underground rock formation, to adjust the at least one expandable member to move the one or more protrusions into or near contact with the underground rock formation; activating the one or more protrusions to fracture the underground rock formation through forcible contact between the one or more protrusions and the underground rock formation; determining a wellbore pressure increase at the location in the wellbore based on the fracture; and determining one or more properties of the underground rock formation based at least in part on the determined wellbore pressure increase.

35 Claims, 7 Drawing Sheets

(51) Int. Cl.
*E21B 49/00* (2006.01)
*E21B 47/06* (2012.01)
*E21B 33/12* (2006.01)
*E21B 47/14* (2006.01)
*G01V 1/50* (2006.01)

(52) U.S. Cl.
CPC ............ *E21B 49/00* (2013.01); *E21B 49/006* (2013.01); *G01V 1/46* (2013.01); *G01V 1/50* (2013.01); *G01N 2203/0064* (2013.01)

(56) References Cited

U.S. PATENT DOCUMENTS

| | | | | |
|---|---|---|---|---|
| 2009/0266548 | A1* | 10/2009 | Olsen | E21B 43/26 166/308.1 |
| 2012/0150515 | A1* | 6/2012 | Hariharan | E21B 33/124 703/7 |
| 2013/0032349 | A1* | 2/2013 | Alekseenko | E21B 43/26 166/308.1 |
| 2015/0136388 | A1* | 5/2015 | Fehr | E21B 33/1285 166/250.1 |
| 2015/0176362 | A1* | 6/2015 | Prieto | E21B 33/1208 166/302 |
| 2017/0030188 | A1 | 2/2017 | Lehr | |
| 2018/0119535 | A1* | 5/2018 | Shen | E21B 44/00 |

OTHER PUBLICATIONS

International Search Report and Written Opinion issued in International Application PCT/US2019/014223 dated May 2, 2019, 14 pages.
Kaneko et al., "Static Rock Splitter Using Shape Memory Alloy as Pressure Source," Journal of Mining and Materials Processing Institute of Japan, Jan. 1991, 4 pages.
Benafan et al., Shape Memory Alloy Rock Splitters (SMARS)—A Non-Explosive Method for Fracturing Planetary Rocklike Materials and Minerals, NASA STI Program, Jul. 2015, 42.
Hirata et al., "Estimation of Damaged Region Around a Tunnel by Compact VSP Probe Using Super Elastic Alloy," 9th IRSM Congress, International Society for Rock Mechanics, Jan. 1999, 4 pages.
Hay, "Development of an Insitu Rock Shear Testing Device," Dissertation for the Degree of Doctor of Philosophy, University of Florida, Graduate School, 2007, 67 pages.
GCC Examination Report in GCC Appln. No. GC 2019-36877, dated Apr. 15, 2020, 4 pages.

* cited by examiner

DETERMINING IN-SITU ROCK STRESS

TECHNICAL FIELD

This disclosure relates to methods, systems, and apparatus for determining rock stress in situ from a wellbore.

BACKGROUND

Often, oil and gas operators and geologists desire to determine or estimate maximum and minimum horizontal stresses in a geological formation. For example; a so-called "mini-frac" hydraulic fracturing test may be used to obtain multiple rock failure parameters such as a breakdown pressure, an instantaneous shut-in pressure (ISIP), a fracture gradient, a net fracture pressure, a tensile strength, a fluid efficiency, and a fluid loss coefficient. Such tests may also be used to obtain a magnitude of a minimum horizontal stress, as well as indirectly calculate a maximum horizontal stresses using an analytical or semi-analytical solution. Other techniques and methods can be used to attain indirect measurements of the in situ stresses such as a step rate injectivity or flow back test, a shut-in/decline curve analysis, an inelastic strain recovery technique, or a differential strain curve analysis.

SUMMARY

In a general implementation, a method for determining one or more rock properties includes running a downhole tool into a wellbore formed from a terranean surface to a subterranean zone that includes an underground rock formation. The downhole tool includes one or more protrusions coupled with at least one expandable member by one or more adjustable shape members of the downhole tool. The one or more adjustable shape members include memory metal. The method also includes actuating the downhole tool, at a location in the wellbore adjacent the underground rock formation, to adjust the at least one expandable member to move the one or more protrusions into or near contact with the underground rock formation. The method also includes activating the one or more adjustable shape members to move the one or more protrusions to fracture the underground rock formation through forcible contact between the one or more protrusions and the underground rock formation. The method also includes determining a wellbore pressure increase at the location in the wellbore based on the fracture. The method also includes determining one or more properties of the underground rock formation based at least in part on the determined wellbore pressure increase.

An aspect combinable with the general implementation further includes, prior to actuating the downhole tool actuating a first wellbore seal of the downhole tool at an uphole end of the location in the wellbore; actuating a second wellbore seal of the downhole tool at a downhole end of the location in the wellbore.

Another aspect combinable with any of the previous aspects further includes, based on the actuation of the first and second wellbore seals, fluidly isolating a volume of the wellbore at the location adjacent the underground rock formation from respective volumes of the wellbore uphole of the first wellbore seal and downhole of the second wellbore seal.

In another aspect combinable with any of the previous aspects, each of the first and second wellbore seals includes a packer.

Another aspect combinable with any of the previous aspects further includes, prior to actuating the downhole tool and subsequent to fluidly isolating the volume of the wellbore at the location adjacent the underground rock formation, determining a static or flowing bottom hole pressure of the wellbore at the location adjacent the underground rock formation.

Another aspect combinable with any of the previous aspects further includes subsequent to the fracture, through contacting engagement of the one or more protrusions with the underground rock formation, determining a wellbore pressure at the location in the wellbore.

Another aspect combinable with any of the previous aspects further includes determining the wellbore pressure increase at the location in the wellbore based on a difference between the static or flowing bottom hole pressure and the wellbore pressure at the location in the wellbore.

In another aspect combinable with any of the previous aspects, the memory metal includes a shape memory alloy.

In another aspect combinable with any of the previous aspects, the shape memory alloy includes a copper-aluminum-nickel alloy or a nickel-titanium alloy.

In another aspect combinable with any of the previous aspects, activating the one or more adjustable shape members includes heating the one or more adjustable shape members; and adjusting a shape of the one or more adjustable shape members based on the heating.

In another aspect combinable with any of the previous aspects, heating the one or more adjustable shape members includes transmitting electrical power to the one or more protrusions of the downhole tool; heating the one or more protrusions with the electrical power; and conductively transferring heat from the heated one or more protrusions to the one or more adjustable shape members.

In another aspect combinable with any of the previous aspects, actuating the downhole tool to adjust the at least one expandable member includes at least one of shifting a wedge into contact with the at least one expandable member to radially move the at least one expandable member away from a radial centerline of the downhole tool; or fluidly expanding a bladder positioned to contact the at least one expandable member to radially move the at least one expandable member away from a radial centerline of the downhole tool.

Another aspect combinable with any of the previous aspects further includes de-activating the one or more adjustable shape members to cease the forcible contact between the one or more protrusions and the underground rock formation.

Another aspect combinable with any of the previous aspects further includes rotating the at least one expandable member.

Another aspect combinable with any of the previous aspects further includes re-activating the one or more adjustable shape members to move the one or more protrusions to fracture the underground rock formation through forcible contact between the one or more protrusions and the underground rock formation.

Another aspect combinable with any of the previous aspects further includes determining another wellbore pressure increase at the location in the wellbore based on the fracture.

Another aspect combinable with any of the previous aspects further includes receiving one or more acoustic signals at the downhole tool that is caused by the fracture; and determining at least one azimuth angle of one or more far-field stresses based on the one or more acoustic signals.

In another aspect combinable with any of the previous aspects, the one or more properties of the underground rock formation includes one or more stresses of a stress state of the underground rock formation.

In another general implementation, a downhole tool system includes a downhole tool including a housing configured to couple to a downhole conveyance. At least a portion of the housing includes a perforated section. The system further includes at least one expandable member positioned within the perforated section of the housing; and one or more protrusions coupled with at least one expandable member through one or more adjustable shape members. The one or more adjustable shape members include memory metal. The system further includes a control system communicably coupled to the downhole tool and configured to perform operations. The operations include actuating the downhole tool, at a location in the wellbore adjacent an underground rock formation, to adjust the at least one expandable member to move the one or more protrusions into or near contact with the underground rock formation. The operations further include activating the one or more adjustable shape members to move the one or more protrusions to fracture the underground rock formation through forcible contact between the one or more protrusions and the underground rock formation. The operations further include determining a wellbore pressure increase at the location in the wellbore based on the fracture. The operations further include determining one or more properties of the underground rock formation based at least in part on the determined wellbore pressure increase.

An aspect combinable with the general implementation further includes a first wellbore seal positioned on the tool uphole of the at least one expandable member and the one or more protrusions; and a second wellbore seal positioned on the tool downhole of the at least one expandable member and the one or more protrusions.

In another aspect combinable with any of the previous aspects, the control system is configured to perform further operations including actuating the first wellbore seal of the downhole tool at an uphole end of the location in the wellbore, and actuating the second wellbore seal of the downhole tool at a downhole end of the location in the wellbore to fluidly isolate a volume of the wellbore at the location adjacent the underground rock formation from respective volumes of the wellbore uphole of the first wellbore seal and downhole of the second wellbore seal.

In another aspect combinable with any of the previous aspects, each of the first and second wellbore seals includes a packer.

Another aspect combinable with any of the previous aspects further includes a pressure monitoring sub-assembly mounted in the housing positioned to receive a wellbore fluid flow from the underground rock formation through the perforated section of the housing.

In another aspect combinable with any of the previous aspects, the control system is configured to perform further operations including, prior to actuating the downhole tool and subsequent to fluidly isolating the volume of the wellbore at the location adjacent the underground rock formation, controlling the pressure monitoring sub-assembly to determine a static or flowing bottom hole pressure of the wellbore at the location adjacent the underground rock formation.

In another aspect combinable with any of the previous aspects, the control system is configured to perform further operations including, subsequent to the fracture, through contacting engagement of the one or more protrusions with the underground rock formation, controlling the pressure monitoring sub-assembly to determine a wellbore pressure at the location in the wellbore; and determining the wellbore pressure increase at the location in the wellbore based on a difference between the static or flowing bottom hole pressure and the wellbore pressure at the location in the wellbore.

In another aspect combinable with any of the previous aspects, the memory metal includes a shape memory alloy.

In another aspect combinable with any of the previous aspects, the shape memory alloy includes a copper-aluminum-nickel alloy or a nickel-titanium alloy.

In another aspect combinable with any of the previous aspects, the operation of activating the one or more adjustable shape members includes heating the one or more adjustable shape members; and adjusting a shape of the one or more adjustable shape members based on the heating.

In another aspect combinable with any of the previous aspects, the control system is configured to perform further operations including controlling a transmission of electrical power to the one or more protrusions of the downhole tool to heat the one or more protrusions and conductively transfer heat from the heated one or more protrusions to the one or more adjustable shape members.

In another aspect combinable with any of the previous aspects, the operation of actuating the downhole tool to adjust the at least one expandable member includes at least one of shifting, in response to a command from the control system, a wedge into contact with the at least one expandable member to radially move the at least one expandable member away from a radial centerline of the downhole tool; or fluidly expanding, in response to a command from the control system, a bladder positioned to contact the at least one expandable member to radially move the at least one expandable member away from a radial centerline of the downhole tool.

Another aspect combinable with any of the previous aspects further includes a rotating sub-assembly coupled to the at least one expandable member.

In another aspect combinable with any of the previous aspects, the control system is configured to perform further operations including de-activating the one or more adjustable shape members to cease the forcible contact between the one or more protrusions and the underground rock formation; controlling the rotating sub-assembly to rotate the at least one expandable member; re-activating the one or more adjustable shape members to move the one or more protrusions to fracture the underground rock formation through forcible contact between the one or more protrusions and the underground rock formation; and controlling the pressure monitoring system to determine another wellbore pressure increase at the location in the wellbore based on the fracture.

Another aspect combinable with any of the previous aspects further includes one or more acoustic receivers positioned in the housing.

In another aspect combinable with any of the previous aspects, the control system is configured to perform further operations including controlling the one or more acoustic receivers to receive one or more acoustic signals at the downhole tool that is caused by the fracture; and determining at least one azimuth angle of one or more far-field stresses based on the one or more acoustic signals.

In another aspect combinable with any of the previous aspects, the one or more properties of the underground rock formation includes one or more stresses of a stress state of the underground rock formation.

Implementations of downhole fracturing tools, systems, and methods according to the present disclosure may include one or more of the following features. For example, implementations can determine wellbore fluid pressure measurements at a particular location in a wellbore caused by one or more fractures (for example, mini-fractures) rather than at a wellhead in order to determine stresses, thereby removing potential misinterpretation of such measurements at the wellhead and inadequate in situ stress values. As another example, implementations may induce fractures at specific points around a wellbore by concentrating stresses at the specific points, thereby inducing such fractures mechanically in multiple directions. Also, implementations may measure maximum horizontal stresses directly using mechanical stress concentration practice. As yet another example, implementations may determine or calculate a directional azimuth of far-field stresses from acoustic events associated with the mechanical fracturing. As another example, implementations can also be used to stimulate tight reservoirs that are sensitive to hydraulic fracturing.

The details of one or more implementations of the subject matter described in this disclosure are set forth in the accompanying drawings and the description. Other features, aspects, and advantages of the subject matter will become apparent from the description, the drawings, and the claims.

DETAILED DESCRIPTION

The present disclosure describes a downhole fracturing tool, as well as downhole fracturing tool systems and methods. For example, in some aspects, implementations of a downhole fracturing tool may take direct measurements of far field in-situ stress magnitudes at different directions by generating one or more fractures (or mini-fractures) through forcible contact of the formation with one or more protrusions of the tool. In some aspects, the one or more protrusions may include or be memory metal, for example a shape memory alloy (SMAs) that is specially designed and fabricated in order to increase "stress concentration" at specific points around a borehole circumference.

In some aspects, memory metal may be made from Nitinol (a trade name for nickel titanium alloy), or other metal material (for example, an alloy) that has a temperature-dependent shape for example. As a memory metal, a temperature of the memory metal may be increased from a particular reference temperature in order to change the shape of a component made from the memory metal, such as elongate or expand the memory metal component. When the component is brought back to the reference temperature, the memory metal may return to its shape at the reference temperature.

One or more implementations of the downhole fracturing tool may include a pressure monitoring system that is configured to measure breakdown and net closure pressures in situ at the formation immediately (or very soon after) fracturing by the one or more protrusions. Implementations of the downhole fracturing tool may also include one or more acoustic receives to record or receive acoustic signals generated by the fracturing by the one or more protrusions (for example, due to rock failure).

Figure 1:
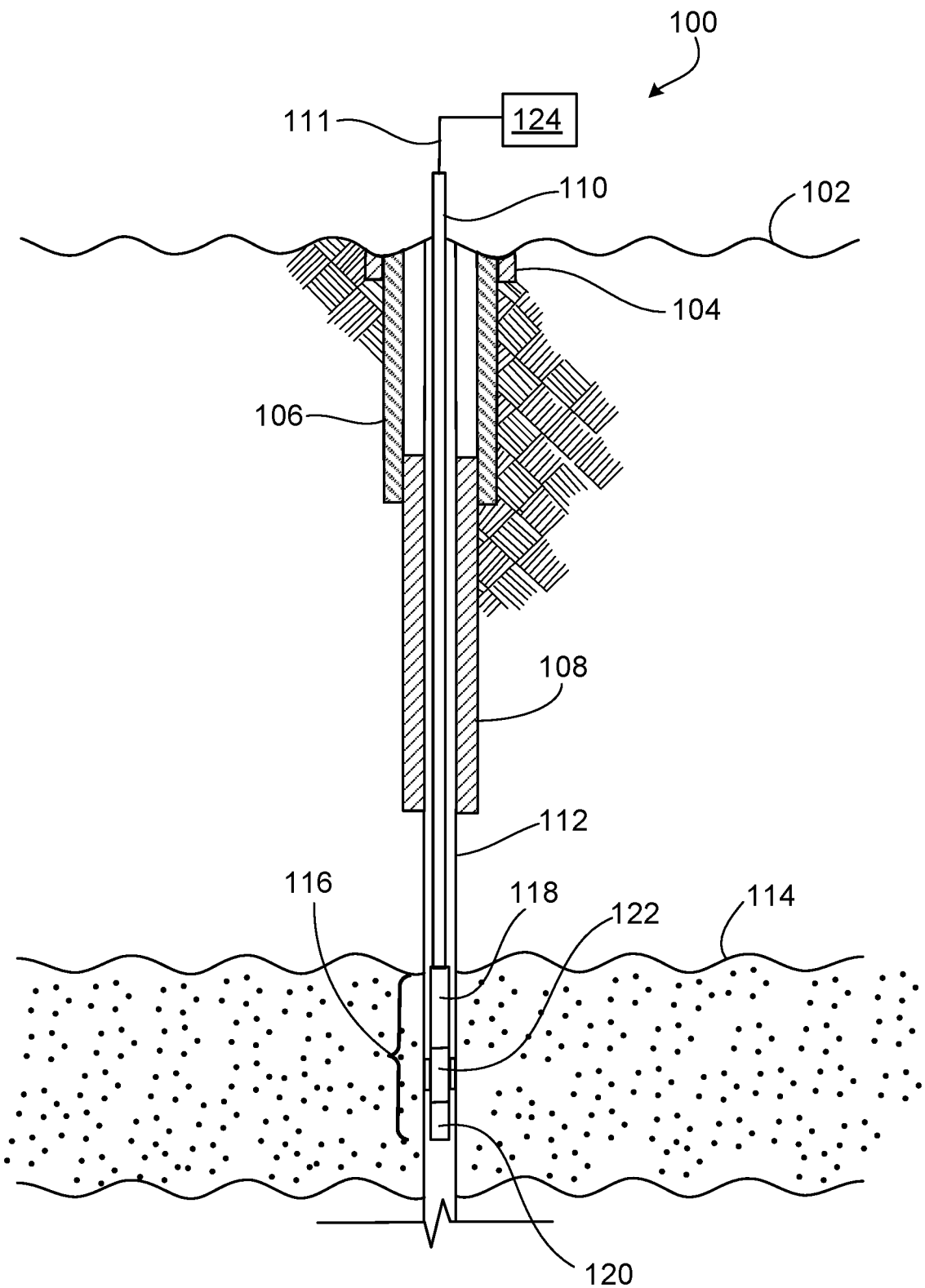
FIG. 1 is a schematic illustration of a wellbore system that includes an example implementation of a downhole fracturing tool.

FIG. 1 is a schematic diagram of an example wellbore system 100 including a downhole fracturing tool 116. Generally, FIG. 1 illustrates a portion of one embodiment of a wellbore system 100 according to the present disclosure in which a fracturing tool, such as the downhole fracturing tool 116, may apply specifically directed mechanical force to a rock formation of a subterranean zone 114. The downhole fracturing tool 116, in some aspects, may obtain representative in situ stress measurements that, for example, may be subsequently used to determine well placement locations, lateral kick off point, casing set point, lateral orientation, injection points, fracture job placement, ideal drilling mud weight, and stimulation operations.

In situ stresses exist underground with different magnitude and orientation. Two critical stress values, maximum and minimum far field stress values, are important for understanding well placement and stimulation jobs, but they can be difficult to predict or measure underground under in situ conditions. In some aspects, the downhole fracturing tool 116 can measure both the maximum and minimum far field stresses directly through a mechanical fracturing operation that forces one or more protrusions on the tool 116 (for example, formed from SMAs) against the rock formation in the subterranean zone 114. The stressed points or regions of the underground rock formation in zone 114 are dilated and eventually fail in tension or shear (for example, mode I or II failure mechanism) due to an increased load at these specific points as produced by the tool 116.

As illustrated in FIG. 1, an implementation of the wellbore system 100 includes a downhole conveyance 110 that is operable to convey (for example, run in, or pull out or both) the downhole fracturing tool 116 into the wellbore 112. Although not shown, a drilling assembly deployed on a terranean surface 102 may form the wellbore 112 prior to running the downhole fracturing tool 116 into the wellbore 112 to a particular location in the subterranean zone 114. The drilling assembly forms the wellbore 112 extending from the terranean surface 102 and through one or more geological formations in the Earth. One or more subterranean formations, such as subterranean zone 114, are located under the terranean surface 102. One or more wellbore casings, such as a surface casing 106 and intermediate casing 108, may be installed in at least a portion of the wellbore 112.

In some embodiments, the wellbore system 100 may be deployed from a surface of a body of water rather than the terranean surface 102. For instance, in some embodiments, the terranean surface 102 may be under an ocean, gulf, sea, or any other body of water under which hydrocarbon-bearing formations may be found. In short, reference to the terranean surface 102 includes both land and under water surfaces and contemplates forming and developing one or more wellbore systems 100 from either or both locations.

In some aspects, the downhole conveyance 110 may be a tubular work string made up of multiple tubing joints. For example, a tubular work string typically consists of sections of steel pipe, which are threaded so that they can interlock together. In alternative aspects, the downhole conveyance 116 may be coiled tubing or wireline.

In some embodiments of the wellbore system 100, the wellbore 112 may be cased with one or more casings. As illustrated, the wellbore 112 includes a conductor casing 104, which extends from the terranean surface 102 shortly into the Earth. A portion of the wellbore 112 enclosed by the conductor casing 104 may be a large diameter borehole. Additionally, in some embodiments, the wellbore 112 may be offset from vertical (for example, a slant wellbore). Even further, in some embodiments, the wellbore 112 may be a stepped wellbore, such that a portion is drilled vertically downward and then curved to a substantially horizontal wellbore portion. Additional substantially vertical and horizontal wellbore portions may be added according to, for example, the type of terranean surface 102, the depth of one or more target subterranean formations, or the depth of one or more productive subterranean formations.

Downhole of the conductor casing 104 may be the surface casing 106. The surface casing 106 may enclose a slightly smaller borehole and protect the wellbore 112 from intrusion of, for example, freshwater aquifers located near the terranean surface 102. The wellbore 112 may then extend vertically downward. This portion of the wellbore 112 may be enclosed by the intermediate casing 108. In some aspects, the location in the wellbore 112 at which the downhole fracturing tool 116 is moved to may be an open hole portion (for example, with no casing present) of the wellbore 112.

As shown in the implementation of FIG. 1, the downhole fracturing tool 116 includes a pressure monitoring sub-assembly 118, a fracturing sub-assembly 122, and a rotating sub-assembly 120. In alternative implementations, one or all of the illustrated components of downhole fracturing tool 116 may be individually coupled (for example, threadingly or through another connection) to the downhole conveyance 110. In the illustrated implementation, however, the downhole fracturing tool 116 includes, for example, the three components described.

In some aspects, the pressure monitoring sub-assembly 118, which may be part of the downhole fracturing tool 116 or part of a separate bottom hole assembly (BHA), may generally measure magnitudes of breakdown pressures, closure pressures, or instantaneous shut-in pressures (ISIP) in situ in the wellbore 112 during an operation of the downhole fracturing tool 116 to fracture the rock formation of the subterranean zone 114. In some aspects, as described in more detail herein, wellbore fluids, released from the rock formation due to fractures created by the downhole fracturing tool 116, may be measured by the pressure monitoring sub-assembly 118 for pressures to calculate one or more stress states of the rock formation.

In some aspects, the pressure monitoring sub-assembly 118 may include or be coupled with one or more wellbore seals (for example, packers) as described later. In some aspects, the one or more wellbore seals may be actuatable to fluidly isolate portions of an annulus of the wellbore 112 near a location of the downhole fracturing tool 116.

In some aspects, the pressure monitoring sub-assembly 118 may also include or be coupled with an acoustic monitoring assembly as described later. For example, the acoustic monitoring assembly may measure or receive acoustic signals associated with or generated by a hydraulic fracture for further analysis and processing.

In some aspects, the fracturing sub-assembly 122 includes the one or more protrusions coupled to the tool 116. As described, the one or more protrusions may be formed from SMAs, or may be coupled to SMAs, which change shape (for example, extend from a fixed point) based on, for instance, a temperature of the material. In some aspects, the SMAs may be designed and positioned on the downhole fracturing tool 116 to change shape based on a temperature change so as to forcibly move the protrusions coupled to the tool 116 into contact with and fracture the rock formation of the subterranean zone 114. For example, the protrusions may be designed and fabricated with different shapes and bodies (for example, conical, hemispherical, rectangular, cylindrical, or another shape) according to, for instance, the distinct lithology of the rock formation so fractures can be induced mechanically and minimize embedment of the protrusions into the rock formation. For example, in relatively soft rock formations, the protrusions may be shaped so as to include protrusions of cylindrical or spherical shapes, while relatively-stiff formations may use cone type shapes for protrusions.

The SMAs that form or are coupled to the one or more protrusions may be a metal type material (for example, copper-aluminum-nickel alloy, nickel-titanium alloy, or other alloyed combinations of copper, zinc, gold, iron, or another metal) that can be shaped into many forms at an induced temperature increase. Further, when the SMAs are allowed to return to a reduced temperature, the protrusions return to their original shape (and size) or position.

As shown in this example implementation of the downhole fracturing tool 116, the rotating sub-assembly 120 is coupled to the fracturing sub-assembly 122. In some aspects, the rotating sub-assembly 120 may generally include a motor (for example, electric, hydraulic, or other power source) that is operable to rotate the fracturing sub-assembly 122 (for example, about an axis parallel with a longitudinal axis of the wellbore 112). Thus, the one or more protrusions (for example, the SMAs) may be rotated (for example, about a 360° axis of rotation) to fracture the rock formation of the subterranean zone 114 at different radial locations of the wellbore 112.

In some aspects, the rotating sub-assembly 120 may include or be coupled with one or more wellbore seals (for example, packers) as described later. In some aspects, the one or more wellbore seals may be actuatable to fluidly isolate portions of an annulus of the wellbore 112 near a location of the downhole fracturing tool 116 (for example, in combination with one or more seals included with or coupled to the pressure monitoring sub-assembly 118).

As illustrated in FIG. 1, the downhole fracturing tool 116 is communicably coupled through a control line 111 to a control system 124, which in this example, is located at the terranean surface 102. The control system 124 may be a microprocessor-based, mechanical, or electro-mechanical controller, as some examples. The control system 124, in some aspects, may send and receive data between it and the downhole fracturing tool 116, as well as, for example, provide electrical power to the downhole fracturing tool 116. The control system 124 may perform one or more operations described in the present disclosure to operate all or parts of the downhole fracturing tool 116.

Figure 2A:
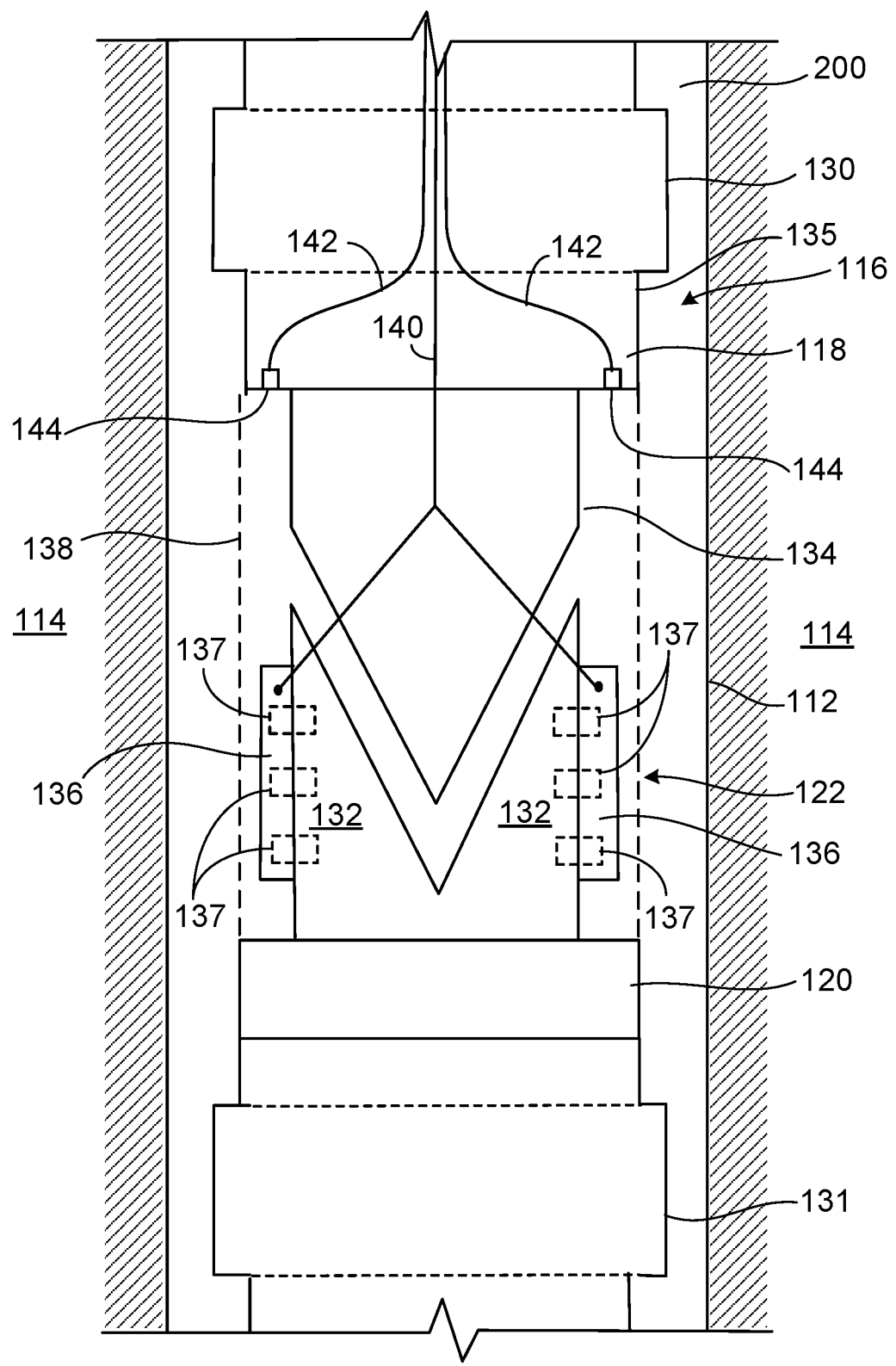
FIGS. 2A-2D are cross-sectional schematic illustrations of an example implementation of a downhole fracturing tool at different operational states.

FIGS. 2A-2D are cross-sectional schematic illustrations of an example implementation of the downhole fracturing tool 116 at different operational states. The downhole fracturing tool 116, as shown in FIG. 2A, for example, is run into the wellbore 112 and positioned near a particular location of the rock formation of subterranean zone 114 (for example, a location at which fractures or micro-fractures are desired). As shown in these figures, the downhole fracturing tool 116 includes or is coupled with an uphole wellbore seal 130 (for example, a high temperature, high pressure elastomeric packer) and a downhole wellbore seal 131 (for example, another high temperature, high pressure elastomeric packer).

As shown in this example, the seals 130 and 131 are positioned so as to locate the fracturing sub-assembly 122, pressure monitoring sub-assembly 118, and the rotating sub-assembly 120 between the seals 130 and 131. One or more acoustic receivers 144 are positioned in this example in or near the pressure monitoring sub-assembly 118 and communicably coupled to the control system 124 through acoustic control lines 142. In some aspects, the acoustic control lines 142 may comprise a part of the control line 111.

As further illustrated, a wedge member 134 is positioned in the downhole fracturing tool 116 uphole of (and in some aspects as part of) the fracturing sub-assembly 122. The fracturing sub-assembly 122 includes, as shown, one or more expandable members 132, which, in this example, are shaped to receive the wedge member 134 during operation of the downhole fracturing tool 116.

Coupled or attached to each of one or more protrusions 136 is a conductor member 140. In some aspects, the conductor member 140 may be formed from an electrically conductive material, such as metal, which is electrically coupled through electrical conductor 140 to an electrical power source at the terranean surface 102, in the downhole fracturing tool 116, or elsewhere in the downhole conveyance 110. In some aspects, the conductor 140 is also part of the control line 111 and the control system 124 controls a delivery of electrical current through the electrical conductor 140 to the protrusion(s) 136.

As further shown in this example, the rotating sub-assembly 120 is coupled to the one or more expandable members 132 of the fracturing sub-assembly 122. The one or more expandable members 132 (along with the conductive members 136) may be free to rotate about a centerline axial axis of the downhole fracturing tool 116 upon operation of the rotating sub-assembly 120.

As shown in FIG. 2A, in the illustrated implementation, the protrusions 136 are coupled with the expandable members 132 with one or more adjustable shape members 137. As shown, the adjustable shape members 137, shown in this example as cylindrical shapes embedded within and between the protrusions 136 and expandable members 132, may be SMAs. As described, the one or more protrusions 136 are coupled to the adjustable shape members 137 (as SMAs), which change shape (for example, extend from a fixed point) based on, for instance, a temperature of the material of the SMAs. In some aspects, the SMAs may be designed and positioned within and between the expandable members 132 and protrusions 136 to change shape based on a temperature change so as to forcibly move the protrusions 136 into contact with and fracture a rock formation.

The example implementation of the downhole fracturing tool 116 includes a radial exterior housing 135, which includes a perforated portion 138 (shown here directly downhole of the pressure monitoring sub-assembly 118). In some aspects, the perforated housing 138 may allow a flow of a wellbore fluid into the pressure monitoring sub-assembly 118 once fractures are induced. In some aspects, the perforated portion 138 is made with a sustainable material so as to withstand a harsh downhole environment (for example, high temperature, high pressure, sand production and corrosive fluids). In some aspects, one or more of the protrusions (for example, SMAs) are attached within the fracturing sub-assembly 122 so that they are flexible and can be moved and removed from the perforated portion 138.

An example operation of the downhole fracturing tool 116 is described with reference to FIGS. 2A-2D. For example, with reference to FIG. 2A, the downhole fracturing tool 116 is shown in a run-in position. In the run-in (or unactuated) position, the downhole fracturing tool 116 is not actuated and neither are the uphole and downhole wellbore seals 130 and 131. The downhole fracturing tool 116 may be positioned, on the downhole conveyance 110, into the wellbore 112 in the run-in position at a desired depth or location adjacent the rock formation of the subterranean zone 114.

Figure 2B:
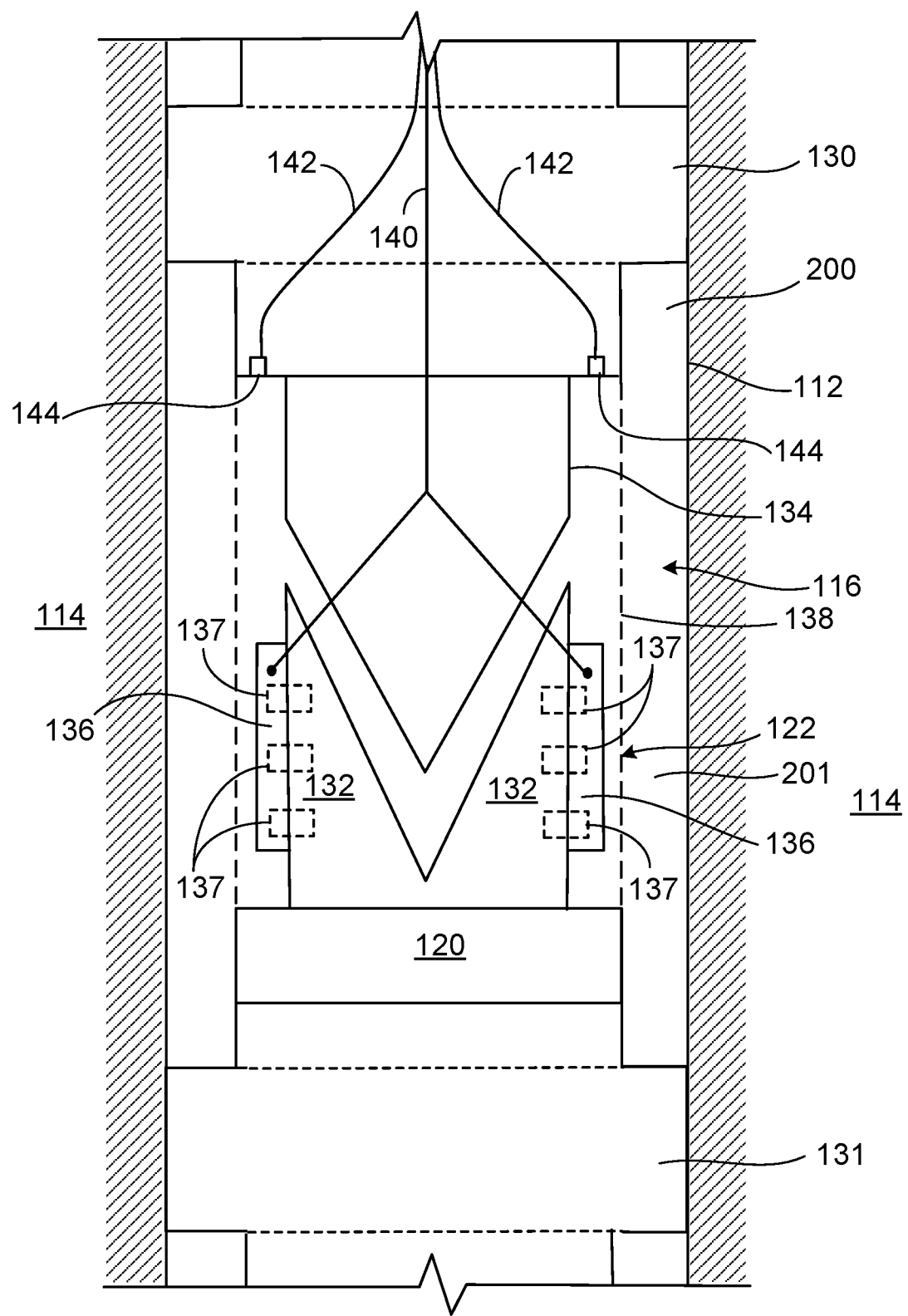

Next, and turning to FIG. 2B, the downhole fracturing tool 116 may be set at the desired depth or location in the wellbore 112. As shown in this figure, the uphole and downhole wellbore seals 130 and 131 are actuated (for example, mechanically or by another actuation technique) to fluidly seal a portion 201 of an annulus 200 of the wellbore 112 apart from other portions of the annulus 200 that are uphole of the uphole wellbore seal 130 and downhole of the downhole wellbore seal 131. Generally, the seal 130 and 131 may be set so as to fluidly seal the portion 201 of the annulus 200 adjacent a desired fracturing location of the subterranean zone 114.

Figure 2C:
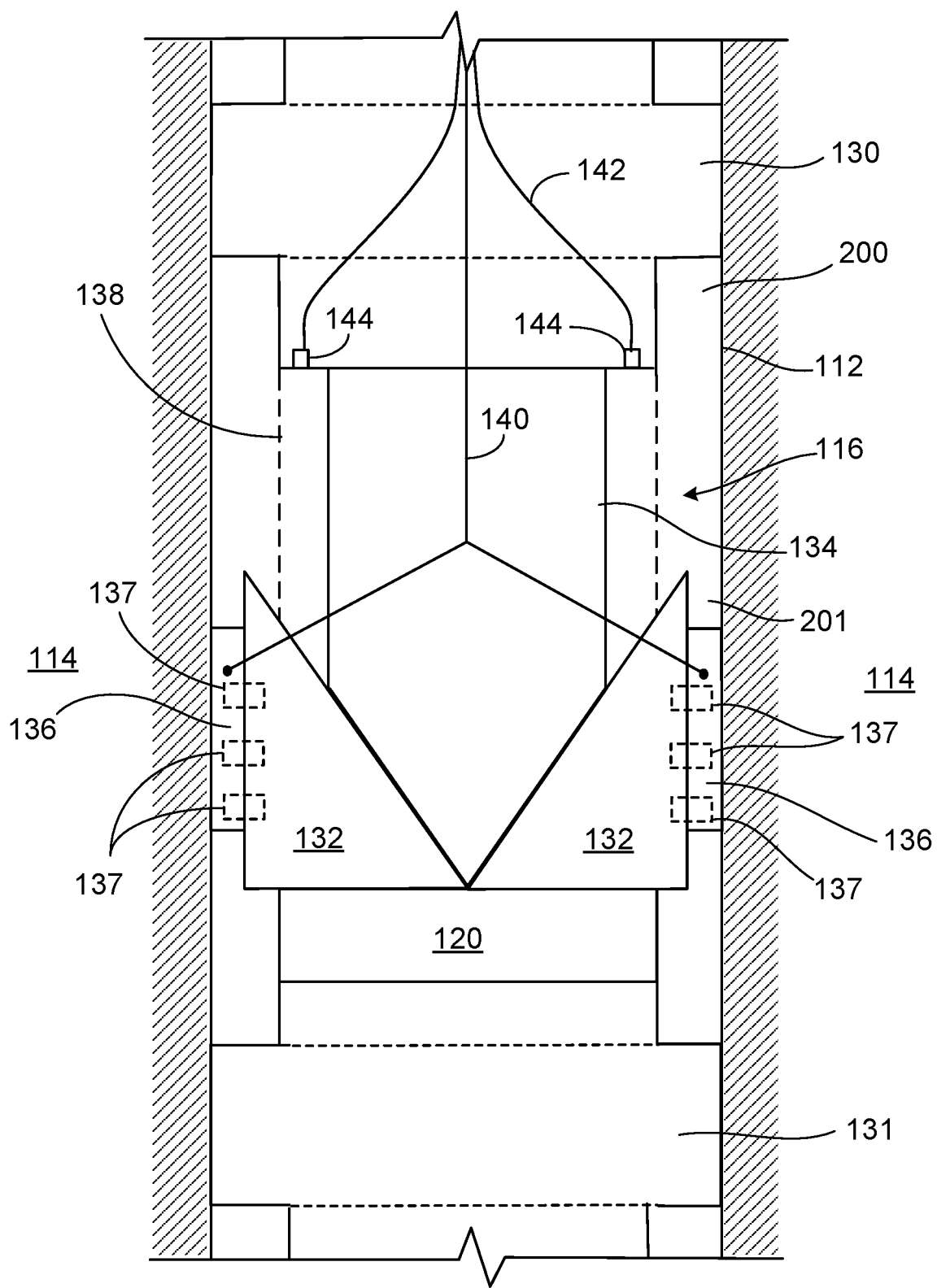

Next, and turning to FIG. 2C, the downhole fracturing tool 116 is actuated by moving (for example, mechanically with a shifting tool or by command of the control system 124) the wedge member 134 toward the expandable members 132 to radially adjust the one or more protrusions 136 into contact with the rock formation of the subterranean zone 114. At this step, wellbore fluids may be received into the pressure monitoring sub-assembly 118 (for example, through the perforated chamber 138 so as to filter sand and other debris). The pressure monitoring sub-assembly 118 may measure the downhole pressure in the sealed portion 201 of the annulus 200, and provide the measurements to the control system 124 (for example, through control line 111). For example, the control system 124 may determine static bottom-hole pressures or a flowing bottom-hole pressures at this step.

Figure 2D:
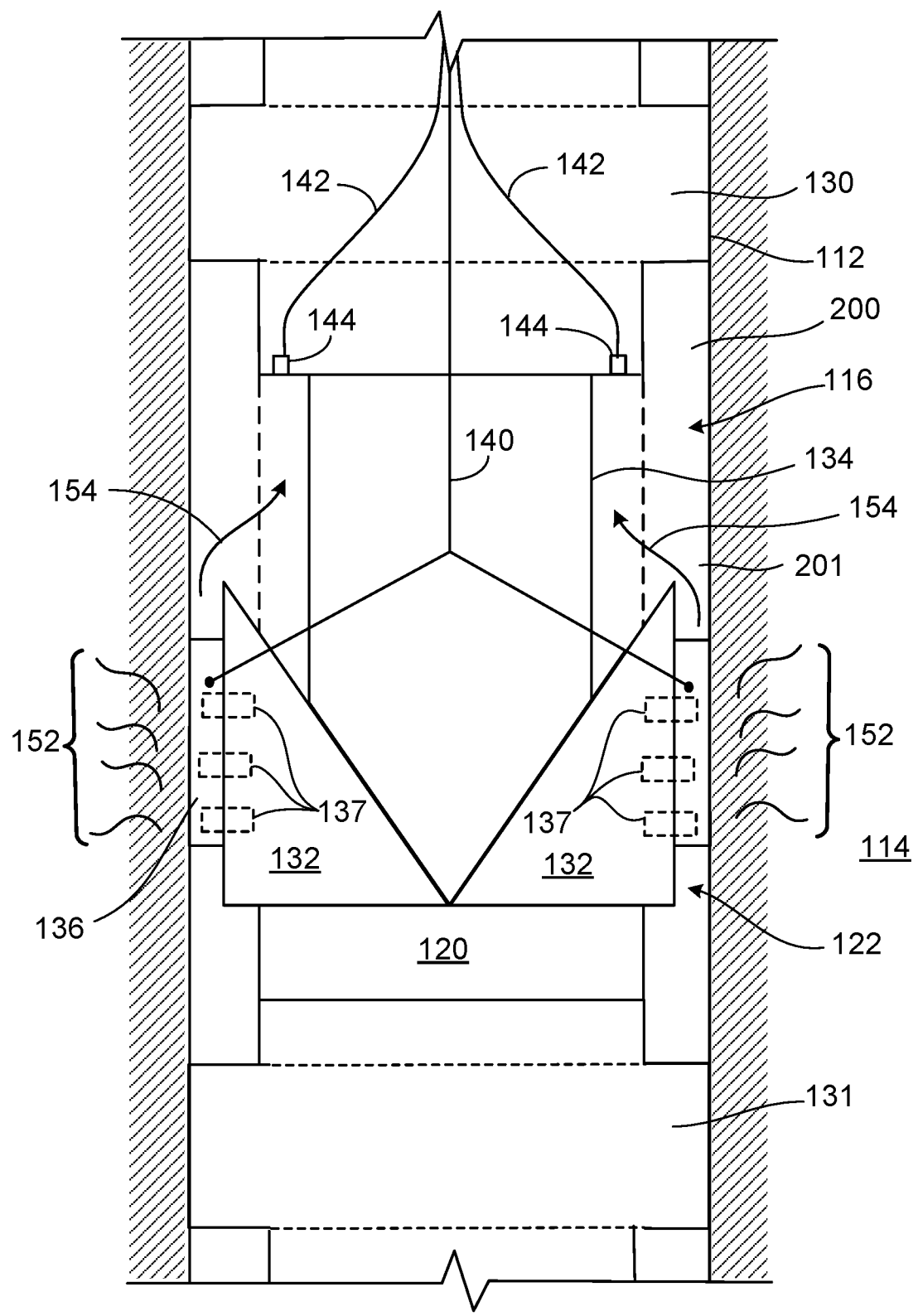

Next, and turning to FIG. 2D, the one or more protrusions 136 are adjusted into fracturing contact (for example, forced into the rock formation to cause one or more fractures) by a change of shape of the one or more adjustable shape members 137. For example, based on a change of temperature of the adjustable shape members 137 (as SMAs), the members 137 may, for example, elongate from the extendable members 132 to forcibly urge the protrusions 136 into the rock formation.

For example, in some aspects, an electrical current is provided through conductor 140 to the protrusions 136. The electrical current causes the protrusions 136 to increase in temperature, which in turn, causes the adjustable shape members 137 to increase in temperature. The adjustable shape members 137, as SMAs, change shape based on the increased temperature and expand from the expandable members 132 to cause the protrusions 136 to break the rock formation and cause fractures 152 (or mini-fractures 152) in the rock formation of the zone 114. Once fractured, wellbore fluids 154 may flow into the portion 201 of the annulus 200, through the perforated portion 138, and into the pressure monitoring sub-assembly 118. Further fluid pressures, or changes to fluid pressure such as increases or decreases, may be measured by the pressure monitoring sub-assembly 118.

Further, as part of this step, the applied force of the protrusions 136 as they fracture the rock formation may be measured as a breakdown pressure. For example, the control system 124 may subtract the measured static bottom-hole pressure from the increased pressure after the fractures 152 are created. The calculated pressure is the net closure pressure. For example, if the static bottom-hole pressure is 3000 pounds per square inch (psi) and the pressure after fracture has increased by 300 psi, then the net closure pressure is 2700 psi, which is the ISIP. Thus, the pressure required to close the created fractures 152 is 2700 psi. The ISIP represents the magnitude of the in situ stress or the minimum horizontal stress.

In some aspects, the pressure monitor sub-assembly 118 also measures a flowing bottom hole pressure. The fracture closure pressure can be calculated by subtracting the flowing bottom-hole pressure from the instantaneous shut-in pressure (ISIP). For example, as the protrusions 136 expand to contact the wellbore 112, an opposed force (for example, a force that the wellbore 112 applies on the protrusions 136 that is equal and opposite to the force that the protrusions 136 apply to the wellbore 112) is measured to determine the axial force load.

In some aspects, during fracturing as shown in FIG. 2D, the acoustic receivers 144 may receive acoustic signals generated by the rock formation being fractured. The acoustic signals can then be provided, through lines 142, to the control system 124. The control system 124 may then determine, based on the acoustic signals, an azimuth angle of far field stresses of the rock formation. For example, the azimuthal direction of the created fractures 152 by the protrusions 136 may be known since the downhole fracturing tool 116 (and specifically the protrusions 136) will be directed toward a specific direction across a wall of the wellbore 112. Based on the acoustic signals, the control system 124 may characterize the rock failure by analyzing the S and P waves (sonic waves due to the fracturing) that are received by the acoustic receivers 144. This information may help determine the rock failure mode (for example, tension failure or shear failure of the in situ composite rock).

In some aspects, the fracturing step as shown in FIG. 2D may be repeated so as to fracture different radial areas of the rock formation at the desired depth or location. For example, the protrusions 136 may be retracted from the formation of the zone 114 by deactivating the adjustable shape members 137 by reducing or stopping the electric current flowed to the protrusions 136. As the temperature of the protrusions 136 recedes (based on the reduced or ceased electrical current), heat transferred to the adjustable shape members 137 also is reduced. The adjustable shape members 137, as SMAs, may return to a deactivated shape as their temperature decreases, thereby retracting the protrusion 136 and removing the protrusions 136 from contact with the rock formation. In some aspects, the downhole fracturing tool 116 is also deactuated so as to adjust the wedge member 134 uphole. The expandable members 132, therefore, may return to their unactuated state, thereby removing the protrusions 136 from contact with the rock formation as well.

Once the downhole fracturing tool 116 has been deactuated, the rotating sub-assembly 120 may rotate the fracturing sub-assembly 122 (also shown in FIG. 2D) a particular radial distance, such as 90 degrees, 180 degrees, 270 degrees or other rotational distance. Once rotated, the actuation step (as shown in FIG. 2C) and activation step (shown in FIG. 2D) may be repeated to fracture the rock formation again. These steps may be repeated as often as needed, at different desired depths or locations in the wellbore 112, until the desired pressure measurements, desired force measurements, desired acoustic measurements, or a combination of all three, are gathered by the downhole fracturing tool 116. For instance, the downhole fracturing tool 116 may be moved to additional depths or locations by deactuating the wellbore seals 130 and 131 and raising or lowering the downhole fracturing tool 116 in the wellbore 112 (and repeating the described operations).

Figure 3A:
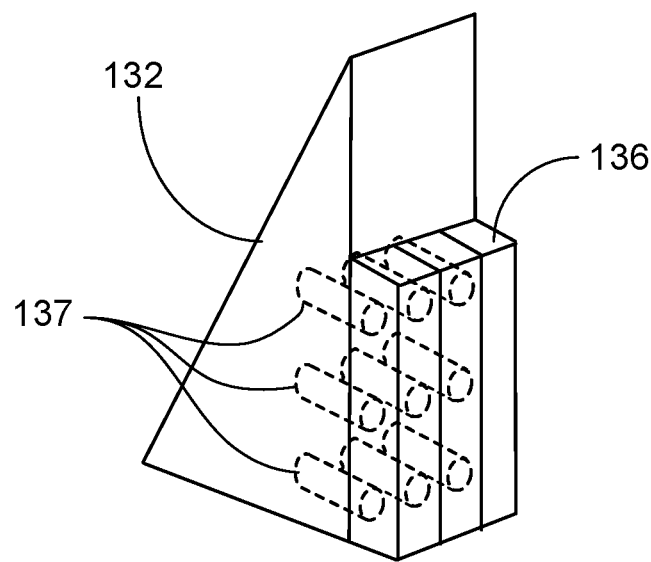
FIGS. 3A-3C are schematic illustrations of example implementations of one or more fracturing protrusions of a downhole fracturing tool.
Figure 3B:
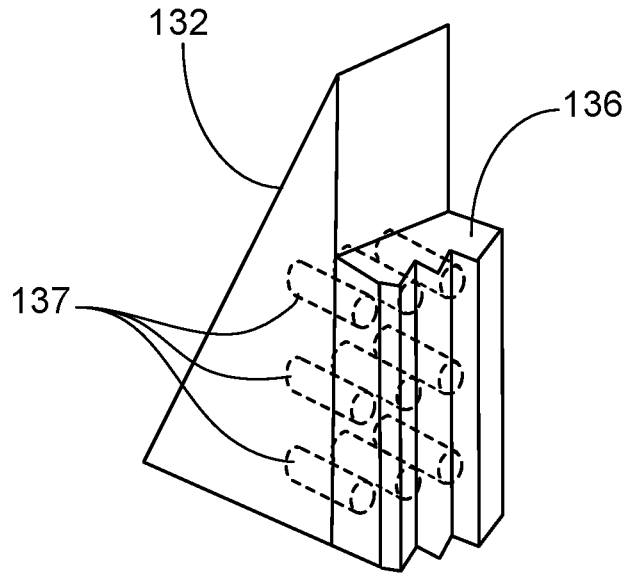
Figure 3C:
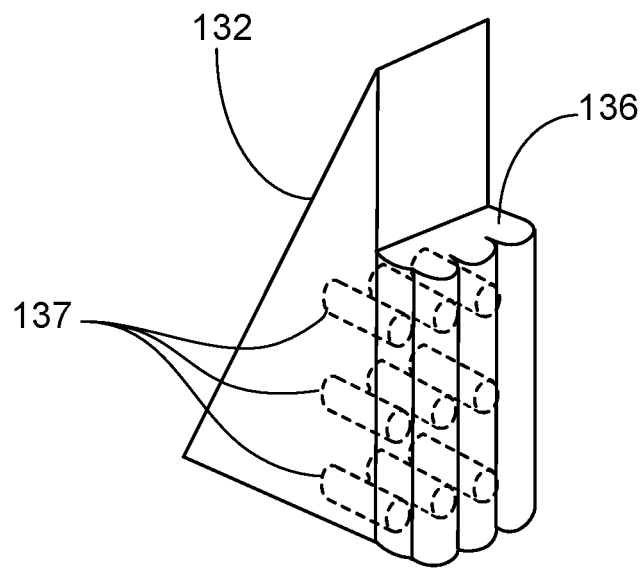

FIGS. 3A-3C are schematic illustrations of example implementations of one or more fracturing protrusions of a downhole fracturing tool, such as downhole fracturing tool 116. Turning to FIG. 3A, for example, an expandable member 132 is shown with multiple, rectangular protrusions 136 coupled together with multiple adjustable shape members 137 (for example, SMAs). A base of each protrusion 136 abuts (and in some examples, may be affixed to) the expandable members 132, with rectangular portions of the protrusions 136 extending (when urged by activated adjustable shape members 137). In some aspects, such a shaped portion (for example, rectangular) may be used in, for example, relatively stiff or laminated rock formations.

Turning to FIG. 3B, an expandable member 132 is shown with multiple, conical protrusions 136 coupled together with multiple adjustable shape members 137 (for example, SMAs). A base of each protrusion 136 abuts (and in some examples, may be affixed to) the expandable members 132, with conical portions of the protrusions 136 extending (when urged by activated adjustable shape members 137). In some aspects, such a conical portion of the protrusions 136 may be used in, for example, very stiff rock formations.

Turning to FIG. 3C, an expandable member 132 is shown with multiple, rounded protrusions 136 coupled together with multiple adjustable shape members 137 (for example, SMAs). A base of each protrusion 136 abuts (and in some examples, may be affixed to) the expandable members 132, with a rectangular portions of the protrusions 136 extending (when urged by activated adjustable shape members 137). In some aspects, such a rounded portion of the protrusions 136 may be used in, for example, relatively soft rock formations.

Figure 4:
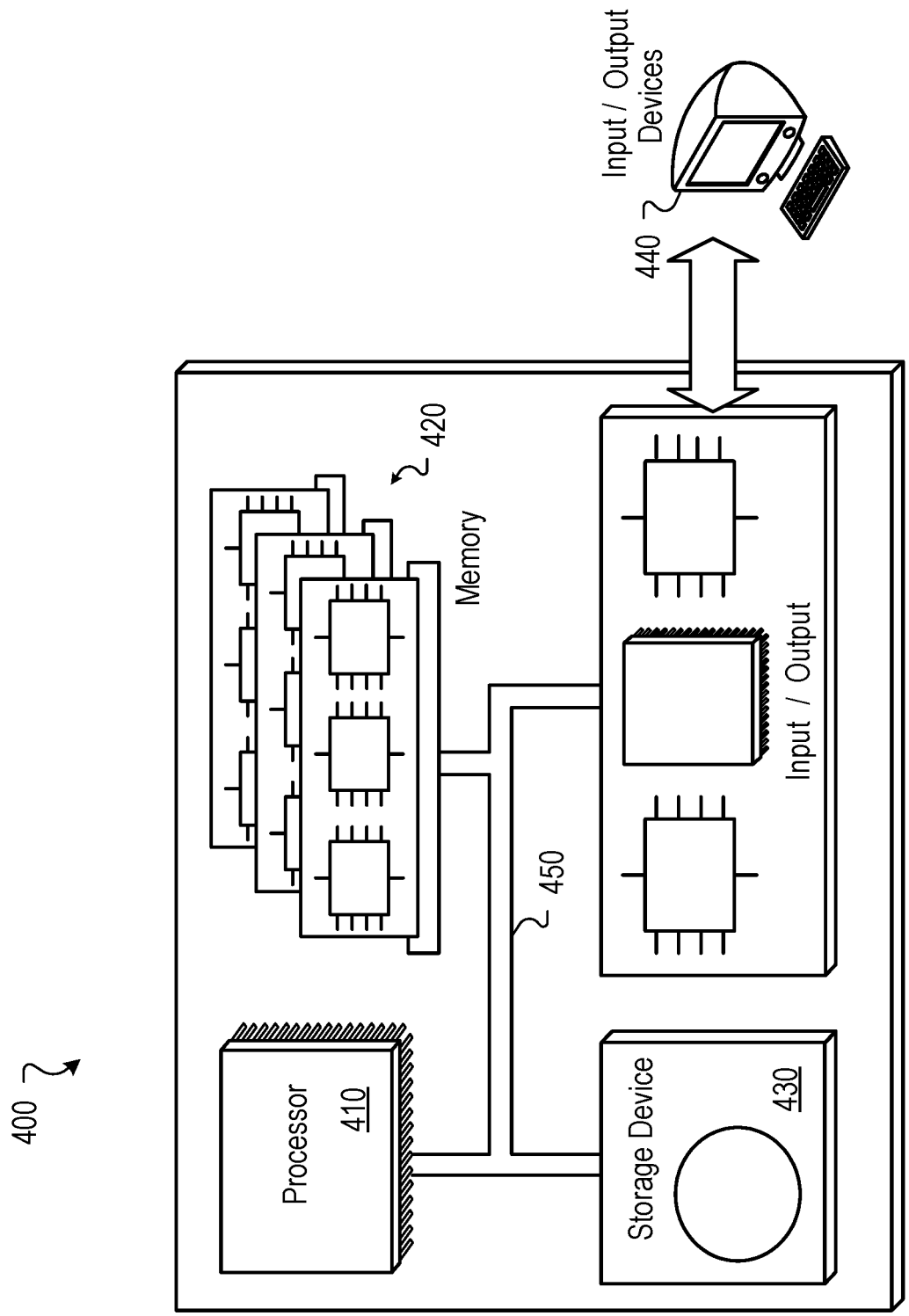
FIG. 4 is a schematic illustration of an example controller for a downhole fracturing tool according to the present disclosure.

FIG. 4 is a schematic illustration of an example controller 400 (or control system 400) for a downhole fracturing tool. For example, the controller 400 can be used for the operations described previously, for example as or as part of the control system 124, or other controllers described herein. For example, the controller 400 may be communicably coupled with, or as a part of, a downhole fracturing tool (such as downhole fracturing tool 116) as described herein.

The controller 400 is intended to include various forms of digital computers, such as printed circuit boards (PCB), processors, digital circuitry, or other hardware. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 400 includes a processor 410, a memory 420, a storage device 430, and an input/output device 440. Each of the components 410, 420, 430, and 440 are interconnected using a system bus 450. The processor 410 is capable of processing instructions for execution within the controller 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the controller 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the controller 400. In one implementation, the storage device 430 is a computer-readable medium. In various different implementations, the storage device 430 may be a floppy disk device, a hard disk device, an optical disk device, or a tape device.

The input/output device 440 provides input/output operations for the controller 400. In one implementation, the input/output device 440 includes a keyboard, a pointing device, or both. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any claims or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method for determining one or more rock properties, comprising:
running a downhole tool into a wellbore formed from a terranean surface to a subterranean zone that comprises an underground rock formation, the downhole tool comprising one or more protrusions coupled with at least one expandable member by one or more adjustable shape members of the downhole tool, the one or more adjustable shape members comprising memory metal;

actuating the downhole tool, at a location in the wellbore adjacent the underground rock formation, to adjust the at least one expandable member to move the one or more protrusions into or near contact with the underground rock formation;

activating the one or more adjustable shape members to move the one or more protrusions to fracture the underground rock formation by the one or more protrusions through forcible contact between the one or more protrusions and the underground rock formation;

determining a wellbore pressure increase at the location in the wellbore based on the fracture;

determining one or more properties of the underground rock formation based at least in part on the determined wellbore pressure increase;

receiving one or more acoustic signals at the downhole tool, the one or more acoustic signals caused by the fracture; and determining at least one azimuth angle of one or more far-field stresses based on the one or more acoustic signals.

2. The method of claim 1, further comprising, prior to actuating the downhole tool:

actuating a first wellbore seal of the downhole tool at an uphole end of the location in the wellbore;

actuating a second wellbore seal of the downhole tool at a downhole end of the location in the wellbore; and based on the actuation of the first and second wellbore seals, fluidly isolating a volume of the wellbore at the location adjacent the underground rock formation from respective volumes of the wellbore uphole of the first wellbore seal and downhole of the second wellbore seal.

3. The method of claim 2, wherein each of the first and second wellbore seals comprises a packer.

4. The method of claim 2, further comprising, prior to actuating the downhole tool and subsequent to fluidly isolating the volume of the wellbore at the location adjacent the underground rock formation, determining a static or flowing bottom hole pressure of the wellbore at the location adjacent the underground rock formation.

5. The method of claim 4, further comprising:

subsequent to the fracture, through contacting engagement of the one or more protrusions with the underground rock formation, determining a wellbore pressure at the location in the wellbore; and determining the wellbore pressure increase at the location in the wellbore based on a difference between the static or flowing bottom hole pressure and the wellbore pressure at the location in the wellbore.

6. The method of claim 1, wherein the memory metal comprises a shape memory alloy.

7. The method of claim 6, wherein the shape memory alloy comprises a copper-aluminum-nickel alloy or a nickel-titanium alloy.

8. The method of claim 1, wherein activating the one or more adjustable shape members comprises:

heating the one or more adjustable shape members; and adjusting a shape of the one or more adjustable shape members based on the heating.

9. The method of claim 8, wherein heating the one or more adjustable shape members comprises:

transmitting electrical power to the one or more protrusions of the downhole tool;

heating the one or more protrusions with the electrical power; and conductively transferring heat from the heated one or more protrusions to the one or more adjustable shape members.

10. The method of claim 1, wherein actuating the downhole tool to adjust the at least one expandable member comprises at least one of:

shifting a wedge into contact with the at least one expandable member to radially move the at least one expandable member away from a radial centerline of the downhole tool; or fluidly expanding a bladder positioned to contact the at least one expandable member to radially move the at least one expandable member away from a radial centerline of the downhole tool.

11. The method of claim 1, further comprising:

de-activating the one or more adjustable shape members to cease the forcible contact between the one or more protrusions and the underground rock formation;

rotating the at least one expandable member;

re-activating the one or more adjustable shape members to move the one or more protrusions to fracture the underground rock formation through forcible contact between the one or more protrusions and the underground rock formation; and determining another wellbore pressure increase at the location in the wellbore based on the fracture.

12. The method of claim 1, wherein the one or more properties of the underground rock formation comprises one or more stresses of a stress state of the underground rock formation.

13. A downhole tool system, comprising:

a downhole tool comprising:

a housing configured to couple to a downhole conveyance, at least a portion of the housing comprising a perforated section;

at least one expandable member positioned within the perforated section of the housing;

one or more protrusions coupled with at least one expandable member through one or more adjustable shape members, the one or more adjustable shape members comprising memory metal; and one or more acoustic receivers positioned in the housing; and a control system communicably coupled to the downhole tool and configured to perform operations comprising:

actuating the downhole tool, at a location in the wellbore adjacent an underground rock formation, to adjust the at least one expandable member to move the one or more protrusions into or near contact with the underground rock formation;

activating the one or more adjustable shape members to move the one or more protrusions to fracture the underground rock formation with the one or more protrusions through forcible contact between the one or more protrusions and the underground rock formation;

determining a wellbore pressure increase at the location in the wellbore based on the fracture;

determining one or more properties of the underground rock formation based at least in part on the determined wellbore pressure increase;

controlling the one or more acoustic receivers to receive one or more acoustic signals at the downhole tool, the one or more acoustic signals caused by the fracture; and determining at least one azimuth angle of one or more far-field stresses based on the one or more acoustic signals.

14. The downhole tool system of claim 13, further comprising:
a first wellbore seal positioned on the tool uphole of the at least one expandable member and the one or more protrusions; and
a second wellbore seal positioned on the tool downhole of the at least one expandable member and the one or more protrusions, the control system configured to perform further operations comprising:
actuating the first wellbore seal of the downhole tool at an uphole end of the location in the wellbore, and
actuating the second wellbore seal of the downhole tool at a downhole end of the location in the wellbore to fluidly isolate a volume of the wellbore at the location adjacent the underground rock formation from respective volumes of the wellbore uphole of the first wellbore seal and downhole of the second wellbore seal.

15. The downhole tool system of claim 14, wherein each of the first and second wellbore seals comprises a packer.

16. The downhole tool system of claim 14, further comprising a pressure monitoring sub-assembly mounted in the housing positioned to receive a wellbore fluid flow from the underground rock formation through the perforated section of the housing, the control system configured to perform further operations comprising:
prior to actuating the downhole tool and subsequent to fluidly isolating the volume of the wellbore at the location adjacent the underground rock formation, controlling the pressure monitoring sub-assembly to determine a static or flowing bottom hole pressure of the wellbore at the location adjacent the underground rock formation.

17. The downhole tool system of claim 16, wherein the control system is configured to perform further operations comprising:
subsequent to the fracture, through contacting engagement of the one or more protrusions with the underground rock formation, controlling the pressure monitoring sub-assembly to determine a wellbore pressure at the location in the wellbore; and
determining the wellbore pressure increase at the location in the wellbore based on a difference between the static or flowing bottom hole pressure and the wellbore pressure at the location in the wellbore.

18. The downhole tool system of claim 13, wherein the memory metal comprises a shape memory alloy.

19. The downhole tool system of claim 18, wherein the shape memory alloy comprises a copper-aluminum-nickel alloy or a nickel-titanium alloy.

20. The downhole tool system of claim 13, wherein the operation of activating the one or more adjustable shape members comprises:
heating the one or more adjustable shape members; and
adjusting a shape of the one or more adjustable shape members based on the heating.

21. The downhole tool system of claim 20, wherein the control system is configured to perform further operations comprising:
controlling a transmission of electrical power to the one or more protrusions of the downhole tool to heat the one or more protrusions and conductively transfer heat from the heated one or more protrusions to the one or more adjustable shape members.

22. The downhole tool system of claim 13, wherein the operation of actuating the downhole tool to adjust the at least one expandable member comprises at least one of:
shifting, in response to a command from the control system, a wedge into contact with the at least one expandable member to radially move the at least one expandable member away from a radial centerline of the downhole tool; or
fluidly expanding, in response to a command from the control system, a bladder positioned to contact the at least one expandable member to radially move the at least one expandable member away from a radial centerline of the downhole tool.

23. The downhole tool system of claim 16, further comprising a rotating sub-assembly coupled to the at least one expandable member, the control system configured to perform further operations comprising:
de-activating the one or more adjustable shape members to cease the forcible contact between the one or more protrusions and the underground rock formation;
controlling the rotating sub-assembly to rotate the at least one expandable member;
re-activating the one or more adjustable shape members to move the one or more protrusions to fracture the underground rock formation through forcible contact between the one or more protrusions and the underground rock formation; and
controlling the pressure monitoring system to determine another wellbore pressure increase at the location in the wellbore based on the fracture.

24. The downhole tool system of claim 13, wherein the one or more properties of the underground rock formation comprises one or more stresses of a stress state of the underground rock formation.

25. A method for determining one or more rock properties, comprising:
running a downhole tool into a wellbore formed from a terranean surface to a subterranean zone that comprises an underground rock formation, the downhole tool comprising one or more protrusions coupled with at least one expandable member by one or more adjustable shape members of the downhole tool, the one or more adjustable shape members comprising memory metal;
actuating the downhole tool, at a location in the wellbore adjacent the underground rock formation, to adjust the at least one expandable member to move the one or more protrusions into or near contact with the underground rock formation;
activating the one or more adjustable shape members to move the one or more protrusions to fracture the underground rock formation through forcible contact between the one or more protrusions and the underground rock formation;
determining a wellbore pressure increase at the location in the wellbore based on the fracture;
determining one or more properties of the underground rock formation based at least in part on the determined wellbore pressure increase;
de-activating the one or more adjustable shape members to cease the forcible contact between the one or more protrusions and the underground rock formation;
rotating the at least one expandable member;
re-activating the one or more adjustable shape members to move the one or more protrusions to fracture the underground rock formation through forcible contact between the one or more protrusions and the underground rock formation; and
determining another wellbore pressure increase at the location in the wellbore based on the fracture.

26. The method of claim 25, further comprising, prior to actuating the downhole tool:
actuating a first wellbore seal of the downhole tool at an uphole end of the location in the wellbore;
actuating a second wellbore seal of the downhole tool at a downhole end of the location in the wellbore; and
based on the actuation of the first and second wellbore seals, fluidly isolating a volume of the wellbore at the location adjacent the underground rock formation from respective volumes of the wellbore uphole of the first wellbore seal and downhole of the second wellbore seal.

27. The method of claim 25, further comprising, prior to actuating the downhole tool and subsequent to fluidly isolating the volume of the wellbore at the location adjacent the underground rock formation, determining a static or flowing bottom hole pressure of the wellbore at the location adjacent the underground rock formation.

28. The method of claim 27, further comprising:
subsequent to the fracture, through contacting engagement of the one or more protrusions with the underground rock formation, determining a wellbore pressure at the location in the wellbore; and
determining the wellbore pressure increase at the location in the wellbore based on a difference between the static or flowing bottom hole pressure and the wellbore pressure at the location in the wellbore.

29. The method of claim 25, wherein activating the one or more adjustable shape members comprises:
heating the one or more adjustable shape members; and
adjusting a shape of the one or more adjustable shape members based on the heating.

30. The method of claim 25, wherein actuating the downhole tool to adjust the at least one expandable member comprises at least one of:
shifting a wedge into contact with the at least one expandable member to radially move the at least one expandable member away from a radial centerline of the downhole tool; or
fluidly expanding a bladder positioned to contact the at least one expandable member to radially move the at least one expandable member away from a radial centerline of the downhole tool.

31. A method for determining one or more rock properties, comprising:
running a downhole tool into a wellbore formed from a terranean surface to a subterranean zone that comprises an underground rock formation, the downhole tool comprising one or more protrusions coupled with at least one expandable member by one or more adjustable shape members of the downhole tool, the one or more adjustable shape members comprising memory metal;
actuating the downhole tool, at a location in the wellbore adjacent the underground rock formation, to adjust the at least one expandable member to move the one or more protrusions into or near contact with the underground rock formation;
prior to actuating the downhole tool:
actuating a first wellbore seal of the downhole tool at an uphole end of the location in the wellbore;
actuating a second wellbore seal of the downhole tool at a downhole end of the location in the wellbore; and
based on the actuation of the first and second wellbore seals, fluidly isolating a volume of the wellbore at the location adjacent the underground rock formation from respective volumes of the wellbore uphole of the first wellbore seal and downhole of the second wellbore seal;
prior to actuating the downhole tool and subsequent to fluidly isolating the volume of the wellbore at the location adjacent the underground rock formation, determining a static or flowing bottom hole pressure of the wellbore at the location adjacent the underground rock formation;
activating the one or more adjustable shape members to move the one or more protrusions to fracture the underground rock formation by the one or more protrusions through forcible contact between the one or more protrusions and the underground rock formation;
subsequent to the fracture, through contacting engagement of the one or more protrusions with the underground rock formation, determining a wellbore pressure at the location in the wellbore;
determining a wellbore pressure increase at the location in the wellbore based on the fracture;
determining the wellbore pressure increase at the location in the wellbore based on a difference between the static or flowing bottom hole pressure and the wellbore pressure at the location in the wellbore; and
determining one or more properties of the underground rock formation based at least in part on the determined wellbore pressure increase.

32. A method for determining one or more rock properties, comprising:
running a downhole tool into a wellbore formed from a terranean surface to a subterranean zone that comprises an underground rock formation, the downhole tool comprising one or more protrusions coupled with at least one expandable member by one or more adjustable shape members of the downhole tool, the one or more adjustable shape members comprising memory metal;
actuating the downhole tool, at a location in the wellbore adjacent the underground rock formation, to adjust the at least one expandable member to move the one or more protrusions into or near contact with the underground rock formation, where actuating the downhole tool to adjust the at least one expandable member comprises at least one of:
shifting a wedge into contact with the at least one expandable member to radially move the at least one expandable member away from a radial centerline of the downhole tool; or
fluidly expanding a bladder positioned to contact the at least one expandable member to radially move the at least one expandable member away from a radial centerline of the downhole tool;
activating the one or more adjustable shape members to move the one or more protrusions to fracture the underground rock formation by the one or more protrusions through forcible contact between the one or more protrusions and the underground rock formation;
determining a wellbore pressure increase at the location in the wellbore based on the fracture; and determining one or more properties of the underground rock formation based at least in part on the determined wellbore pressure increase.

33. A downhole tool system, comprising:
a downhole tool comprising:
   a housing configured to couple to a downhole conveyance, at least a portion of the housing comprising a perforated section;
   at least one expandable member positioned within the perforated section of the housing;
   one or more protrusions coupled with at least one expandable member through one or more adjustable shape members, the one or more adjustable shape members comprising memory metal; and
   a pressure monitoring sub-assembly mounted in the housing positioned to receive a wellbore fluid flow from the underground rock formation through the perforated section of the housing;
a first wellbore seal positioned on the tool uphole of the at least one expandable member and the one or more protrusions;
a second wellbore seal positioned on the tool downhole of the at least one expandable member and the one or more protrusions; and
a control system communicably coupled to the downhole tool and configured to perform operations comprising:
   actuating the first wellbore seal of the downhole tool at an uphole end of the location in the wellbore;
   actuating the second wellbore seal of the downhole tool at a downhole end of the location in the wellbore to fluidly isolate a volume of the wellbore at the location adjacent the underground rock formation from respective volumes of the wellbore uphole of the first wellbore seal and downhole of the second wellbore seal;
   actuating the downhole tool, at a location in the wellbore adjacent an underground rock formation, to adjust the at least one expandable member to move the one or more protrusions into or near contact with the underground rock formation;
   prior to actuating the downhole tool and subsequent to fluidly isolating the volume of the wellbore at the location adjacent the underground rock formation, controlling the pressure monitoring sub-assembly to determine a static or flowing bottom hole pressure of the wellbore at the location adjacent the underground rock formation;
   activating the one or more adjustable shape members to move the one or more protrusions to fracture the underground rock formation with the one or more protrusions through forcible contact between the one or more protrusions and the underground rock formation;
   subsequent to the fracture, through contacting engagement of the one or more protrusions with the underground rock formation, controlling the pressure monitoring sub-assembly to determine a wellbore pressure at the location in the wellbore;
   determining the wellbore pressure increase at the location in the wellbore based on a difference between the static or flowing bottom hole pressure and the wellbore pressure at the location in the wellbore;
   determining a wellbore pressure increase at the location in the wellbore based on the fracture; and
   determining one or more properties of the underground rock formation based at least in part on the determined wellbore pressure increase.

34. A downhole tool system, comprising:
a downhole tool comprising:
   a housing configured to couple to a downhole conveyance, at least a portion of the housing comprising a perforated section;
   at least one expandable member positioned within the perforated section of the housing; and
   one or more protrusions coupled with at least one expandable member through one or more adjustable shape members, the one or more adjustable shape members comprising memory metal; and
a control system communicably coupled to the downhole tool and configured to perform operations comprising:
   actuating the downhole tool, at a location in the wellbore adjacent an underground rock formation, to adjust the at least one expandable member to move the one or more protrusions into or near contact with the underground rock formation, where the operation of actuating the downhole tool to adjust the at least one expandable member comprises at least one of:
      shifting, in response to a command from the control system, a wedge into contact with the at least one expandable member to radially move the at least one expandable member away from a radial centerline of the downhole tool; or
      fluidly expanding, in response to a command from the control system, a bladder positioned to contact the at least one expandable member to radially move the at least one expandable member away from a radial centerline of the downhole tool;
   activating the one or more adjustable shape members to move the one or more protrusions to fracture the underground rock formation with the one or more protrusions through forcible contact between the one or more protrusions and the underground rock formation;
   determining a wellbore pressure increase at the location in the wellbore based on the fracture; and
   determining one or more properties of the underground rock formation based at least in part on the determined wellbore pressure increase.

35. A downhole tool system, comprising:
a downhole tool comprising:
   a housing configured to couple to a downhole conveyance, at least a portion of the housing comprising a perforated section;
   at least one expandable member positioned within the perforated section of the housing;
   one or more protrusions coupled with at least one expandable member through one or more adjustable shape members, the one or more adjustable shape members comprising memory metal;
   a pressure monitoring sub-assembly mounted in the housing positioned to receive a wellbore fluid flow from the underground rock formation through the perforated section of the housing; and
   a rotating sub-assembly coupled to the at least one expandable member;
a first wellbore seal positioned on the tool uphole of the at least one expandable member and the one or more protrusions;
a second wellbore seal positioned on the tool downhole of the at least one expandable member and the one or more protrusions; and
a control system communicably coupled to the downhole tool and configured to perform operations comprising:

actuating the first wellbore seal of the downhole tool at an uphole end of the location in the wellbore;

actuating the second wellbore seal of the downhole tool at a downhole end of the location in the wellbore to fluidly isolate a volume of the wellbore at the location adjacent the underground rock formation from respective volumes of the wellbore uphole of the first wellbore seal and downhole of the second wellbore seal;

actuating the downhole tool, at a location in the wellbore adjacent an underground rock formation, to adjust the at least one expandable member to move the one or more protrusions into or near contact with the underground rock formation;

prior to actuating the downhole tool and subsequent to fluidly isolating the volume of the wellbore at the location adjacent the underground rock formation, controlling the pressure monitoring sub-assembly to determine a static or flowing bottom hole pressure of the wellbore at the location adjacent the underground rock formation;

activating the one or more adjustable shape members to move the one or more protrusions to fracture the underground rock formation with the one or more protrusions through forcible contact between the one or more protrusions and the underground rock formation;

determining a wellbore pressure increase at the location in the wellbore based on the fracture;

determining one or more properties of the underground rock formation based at least in part on the determined wellbore pressure increase;

de-activating the one or more adjustable shape members to cease the forcible contact between the one or more protrusions and the underground rock formation;

controlling the rotating sub-assembly to rotate the at least one expandable member;

re-activating the one or more adjustable shape members to move the one or more protrusions to fracture the underground rock formation through forcible contact between the one or more protrusions and the underground rock formation; and controlling the pressure monitoring system to determine another wellbore pressure increase at the location in the wellbore based on the fracture.

* * * * *